(12) United States Patent
Lee

(10) Patent No.: US 7,796,380 B2
(45) Date of Patent: Sep. 14, 2010

(54) FASTENING DEVICE FOR COMPUTER READ/WRITE OR STORAGE DEVICE

(76) Inventor: Shu-Nan Lee, 3F, No. 11, Lane 77, Xing-zi Rd., Neihu District, Taipei City 114 (TW)

( * ) Notice: Subject to any disclaimer, the term of this patent is extended or adjusted under 35 U.S.C. 154(b) by 73 days.

(21) Appl. No.: 12/318,666

(22) Filed: Jan. 6, 2009

(65) Prior Publication Data

US 2010/0172085 A1 Jul. 8, 2010

(51) Int. Cl.
*G06F 1/16* (2006.01)

(52) U.S. Cl. .................. 361/679.33; 248/917; 345/204; 709/227; 439/172; 710/300

(58) Field of Classification Search ................ 710/16, 710/260, 72, 300; 439/352, 680, 651, 172; 709/203, 231, 229, 227, 201, 217; 345/107, 345/501, 204; 248/694, 284.1, 917, 309.1, 248/27.1; 361/679.33, 679.31, 679.41, 679.32, 361/679.58, 679.01, 679.29

See application file for complete search history.

(56) References Cited

U.S. PATENT DOCUMENTS

| 7,428,147 B2* | 9/2008 | Lin | 361/679.33 |
| 7,450,375 B2* | 11/2008 | Xu | 361/679.33 |
| 2005/0116135 A1* | 6/2005 | Peng et al. | 248/694 |
| 2006/0034048 A1* | 2/2006 | Xu | 361/685 |

\* cited by examiner

*Primary Examiner*—Hung V Duong
(74) *Attorney, Agent, or Firm*—Rosenberg, Klein & Lee

(57) ABSTRACT

A positioning device for a computer read/write or storage device is provided. The positioning device allows the computer read/write or storage device (such as an optical disk drive, a hard disk drive, or a magnetic disk drive) to be readily installed in a computer chassis and rapidly detached therefrom for replacement without using screws.

2 Claims, 6 Drawing Sheets

US 7,796,380 B2

FASTENING DEVICE FOR COMPUTER READ/WRITE OR STORAGE DEVICE

BACKGROUND OF THE INVENTION

1. Field of the Invention

The present invention relates to an improved fastening device for a computer read/write or storage device (such as an optical disk drive, a hard disk drive, or a magnetic disk drive), wherein the a fastening device is installed at an appropriate location on a read/write or storage device installation frame of a computer chassis so that the computer read/write or storage device can be speedily assembled to the installation frame and rapidly detached therefrom for replacement.

2. Description of Related Art

Referring to FIG. 1, a typical computer chassis 50 mainly contains, among other components, a motherboard, a power supply, a sound card, a display card, and various read/write or storage devices 70 (such as an optical disk drive, a DVD player, a hard disk drive, or a magnetic disk drive). The read/write or storage devices 70 are installed on an installation frame 60, respectively, and secured in position thereto with screws 71.

However, it is an onerous and time-consuming operation to fasten the read/write or storage devices 70 to the installation frame 60 with the screws 71. Besides, while the read/write or storage devices 70 are being secured with the screws 71, the screws 71 often drop unexpectedly and cannot be found. It is very likely that the dropped screws 71 are stuck somewhere in the motherboard so as to short-circuit or even damage the computer.

BRIEF SUMMARY OF THE INVENTION

In view of the fact that the aforementioned shortcomings of the prior art require immediate remedy, the inventor of the present invention, based on years of experience in the relevant industry, took pains in contemplating ways of improvement and finally succeeded in developing a fastening device with an improved structure which enables rapid installation and rapid detachment/replacement of various read/write or storage devices.

The present invention provides an improved fastening device for a computer read/write or storage device (such as an optical disk drive, a hard disk drive, or a magnetic disk drive), wherein the fastening device allows the computer read/write or storage device to be readily installed in a computer chassis and rapidly detached therefrom for replacement without using screws.

BRIEF DESCRIPTION OF THE SEVERAL VIEWS OF THE DRAWINGS

The structure and objectives as well as a preferred mode of implementation and essential concepts of the present invention will be best understood by referring to the following detailed description of an illustrative embodiment in conjunction with the accompanying drawings, wherein.

DETAILED DESCRIPTION OF THE INVENTION

Figure 1:
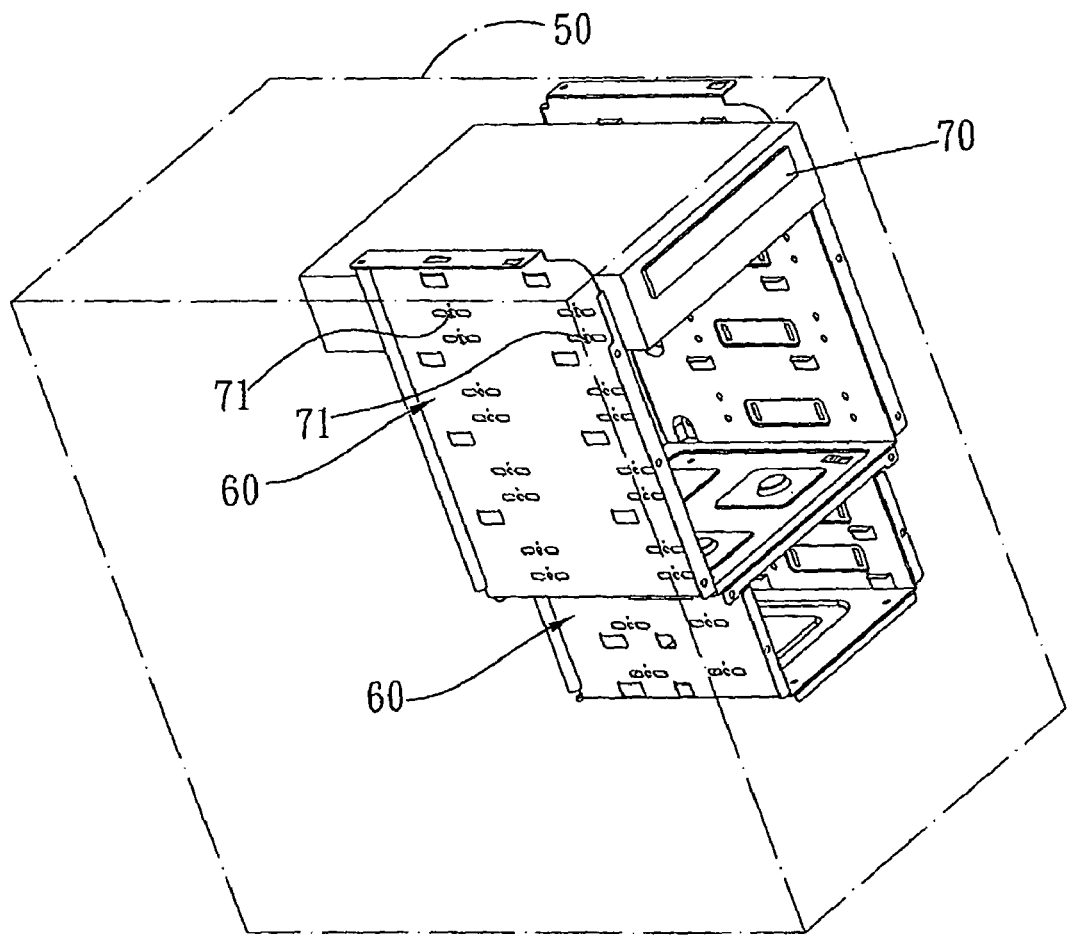
FIG. 1 is a schematic perspective view of a conventional computer chassis in which a read/write or storage device is secured in place with screws.
Figure 2:
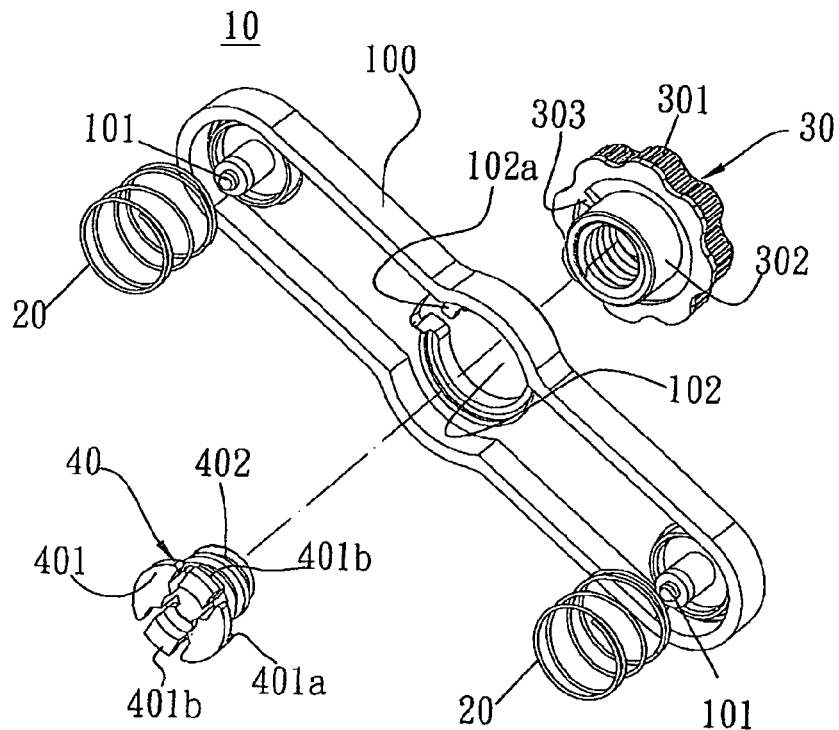
FIG. 2 is an exploded perspective view of a fastening device according to the present invention.

Please refer to FIG. 2 for an exploded perspective view of a fastening device 10 according to the present invention. As shown in the drawing, the fastening device 10 comprises a pressing plate 100, a locking knob 30, and a threaded-post plug 40.

Figure 3:
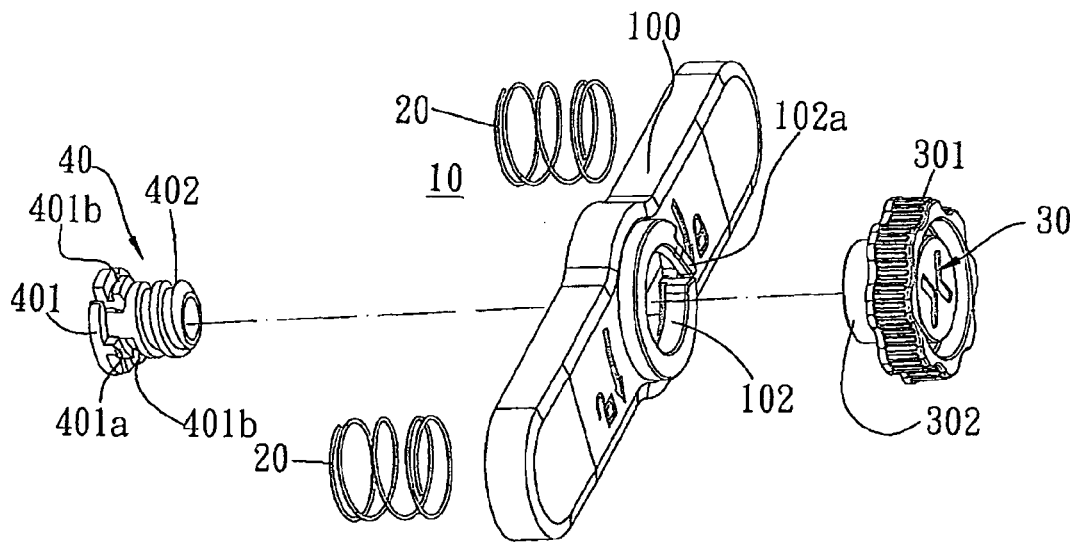
FIG. 3 is another exploded perspective view of the fastening device according to the present invention.

The pressing plate 100 is bilaterally provided with pins 101 and centrally provided with an axial hole 102. As shown more clearly in FIG. 3, the axial hole 102 has an upper rim extended with an inclined projection 102a. In addition, the pins 101 bilaterally provided on the pressing plate 100 are equipped with springs 20, respectively.

The locking knob 30 has a knob portion 301 whose bottom surface is extended centrally with a nut 302. A pushing block 303 is protrudingly provided between the bottom surface of the knob portion 301 and the nut 302.

The threaded-post plug 40 comprises a plug base 401 centrally and protrudingly provided with a threaded post 402. The plug base 401 is provided with a pair of oppositely positioned resilient hooks 401b and a pair of oppositely positioned projecting blocks 401a. In addition, referring to FIG. 4, a read/write or storage device installation frame 60 has a side panel protrudingly provided with at least a fastening hole 602 and two through holes 603 formed by a stamping process. The fastening hole 602 is further formed with engaging recesses 602a. The threaded-post plug 40 is pressed and inserted into the fastening hole 602 so that the resilient hooks 401b of the plug seat 401 are biased inward. When the threaded-post plug 40 is in place, the two resilient hooks 401b spring back and resume their original positions so as to engage with a rim of the fastening hole 602. Meanwhile, the two projecting blocks 401a are inserted into the engaging recess 602a, respectively, thus securing the threaded-post plug 40 in position to the fastening hole 602.

Figure 4:
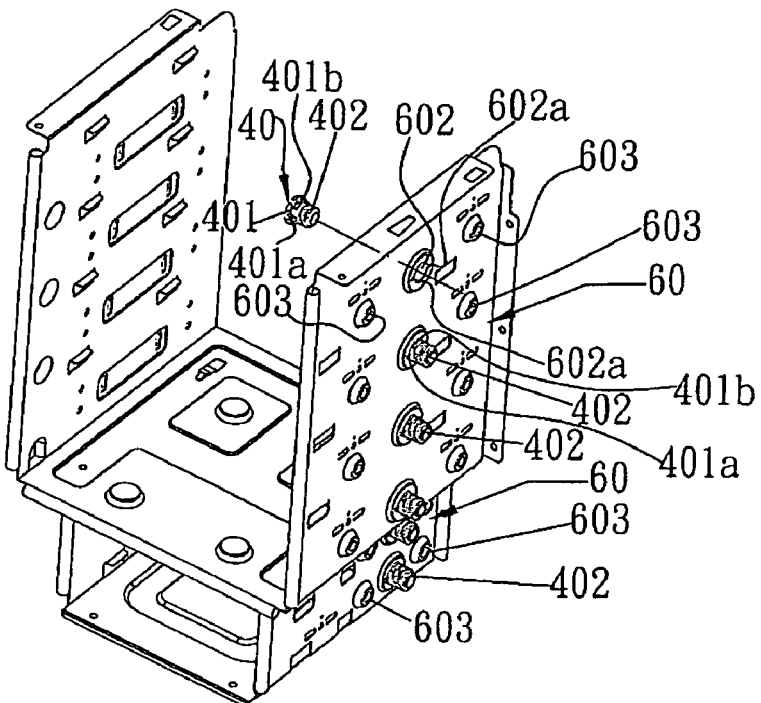
FIG. 4 is a perspective view of a read/write or storage device installation frame according to the present invention, wherein the installation frame is coupled with a plurality of threaded-post plugs according to the present invention.
Figure 5:
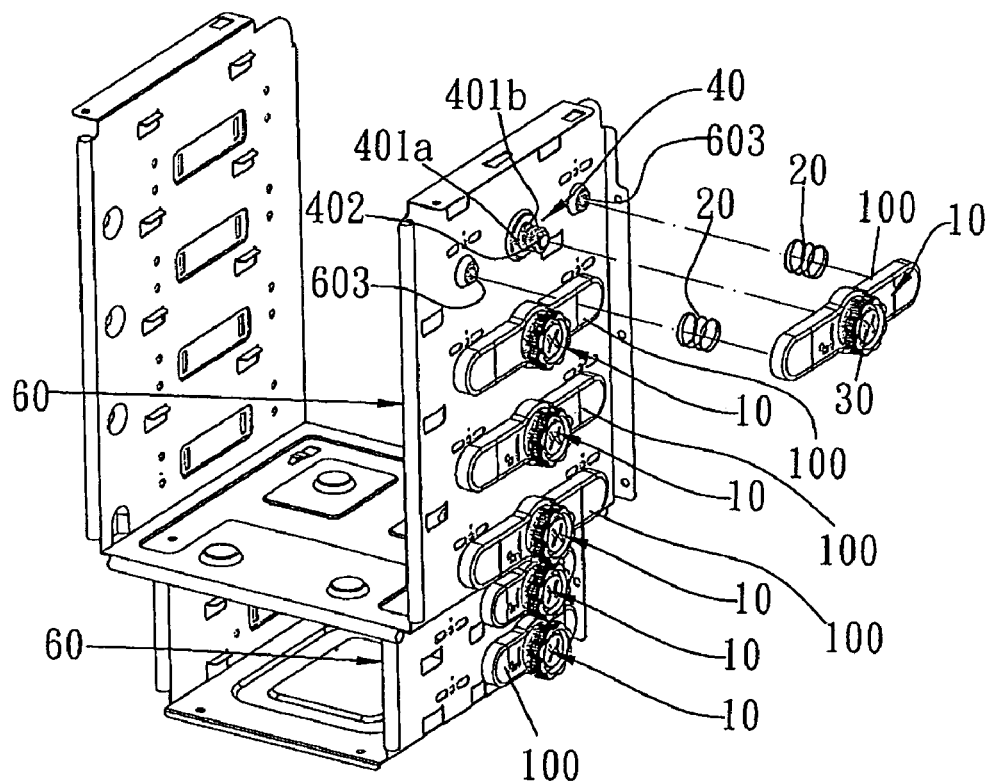
FIG. 5 is another perspective view of the read/write or storage device installation frame according to the present invention, wherein the installation frame is coupled with a plurality of the fastening devices according to the present invention.

As shown in FIG. 4, the fastening holes 602 of the side panel of the read/write or storage device installation frame 60 are coupled with a plurality of the threaded-post plugs 40, respectively. Then, the threaded post 402 of each of the threaded-post plugs 40 is inserted into the axial hole 102 centrally provided on a corresponding said pressing plate 100, as shown in FIG. 5, so that the pins 101 bilaterally provided on the pressing plate 100 and equipped respectively with the springs 20 are inserted into corresponding said through holes 603 of the side panel. Afterward, each said threaded post 402 is fastened with the nut 302 of a corresponding said locking knob 30.

Figure 6:
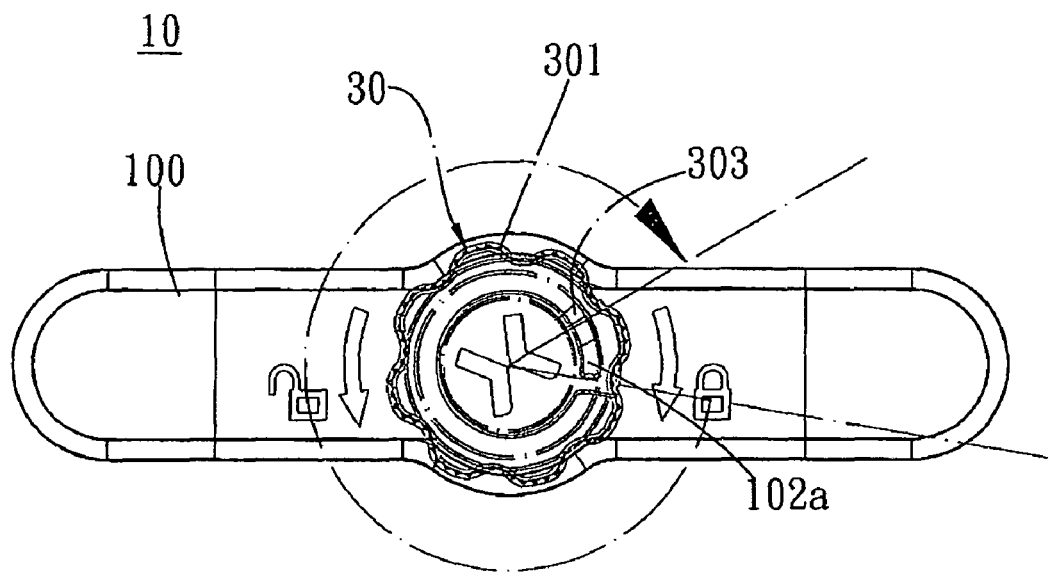
FIG. 6 is a see-through view of the fastening device according to the present invention, showing rotation of a locking knob.
Figure 7:
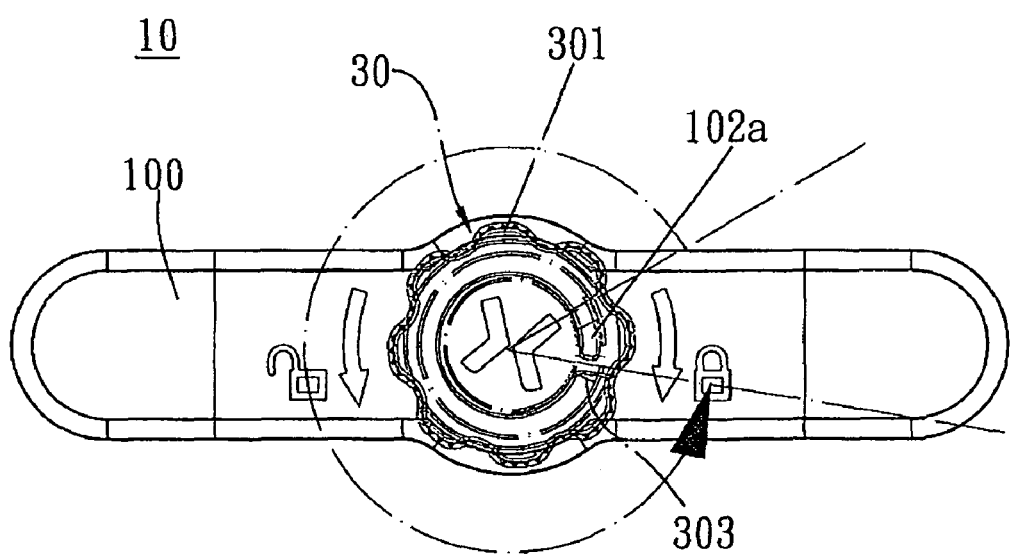
FIG. 7 is another see-through view of the fastening device according to the present invention, showing rotation of the locking knob in an opposite direction.

Referring to FIGS. 6 and 7, when the locking knob 30 is rotated clockwise or counterclockwise by the knob portion 301, the projecting block 303 of the knob portion 301 is pressed against by the inclined projection 102a of the axial hole 102 of the pressing plate 100. Thus, an angular range of the clockwise or counterclockwise rotation of the locking knob 30 is restricted (to less than a full circle) to prevent the locking knob 30 from getting loose and allow the locking knob 30 to drive the pressing plate 100 and its pins 101 to move forward or backward, whereby a read/write or storage device 70 is rapidly fastened in place or rapidly detached.

Figure 8:
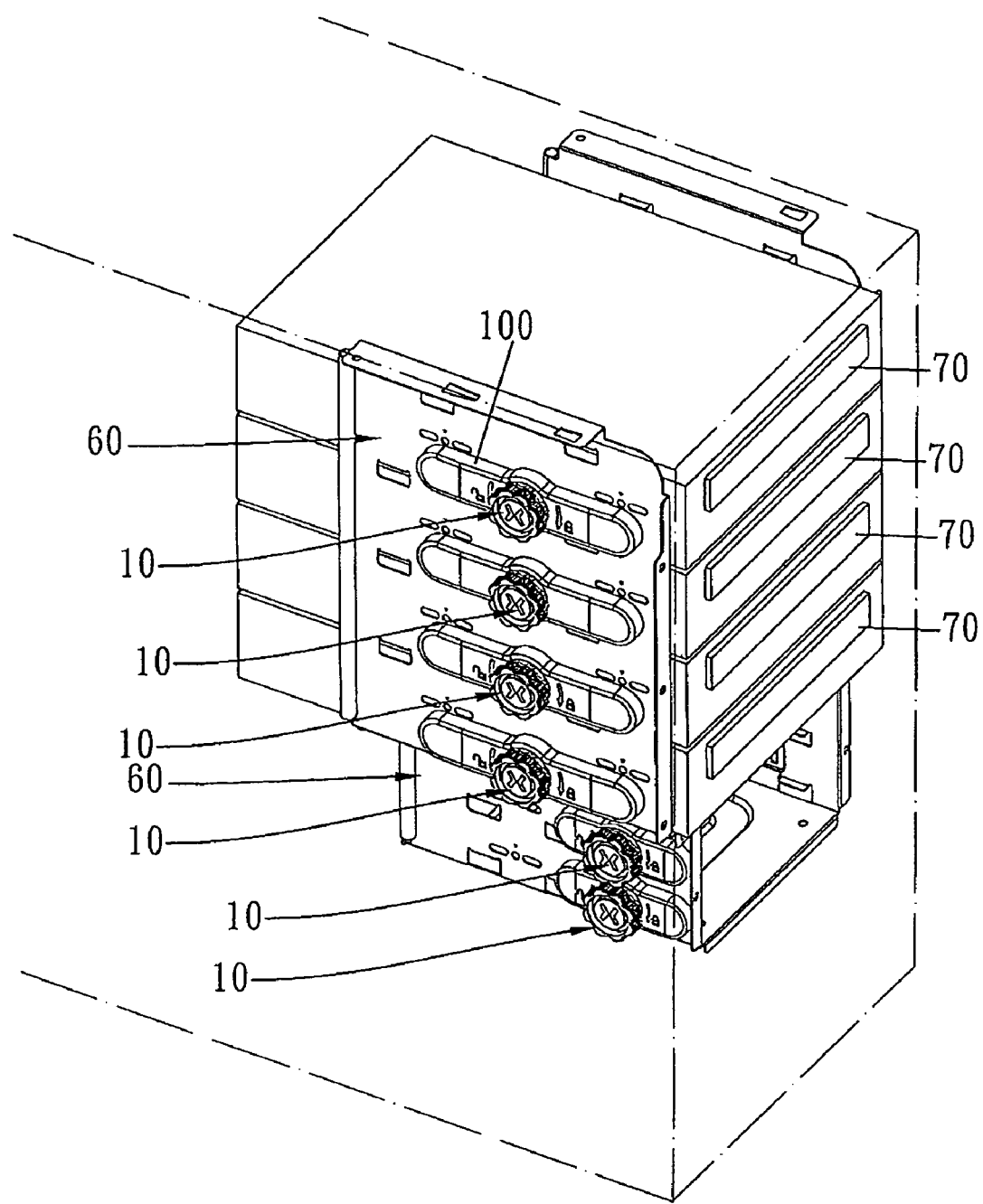
FIG. 8 is a schematic perspective view of a plurality of read/write or storage devices fastened in place by the fastening devices according to the present invention.
Figure 9:
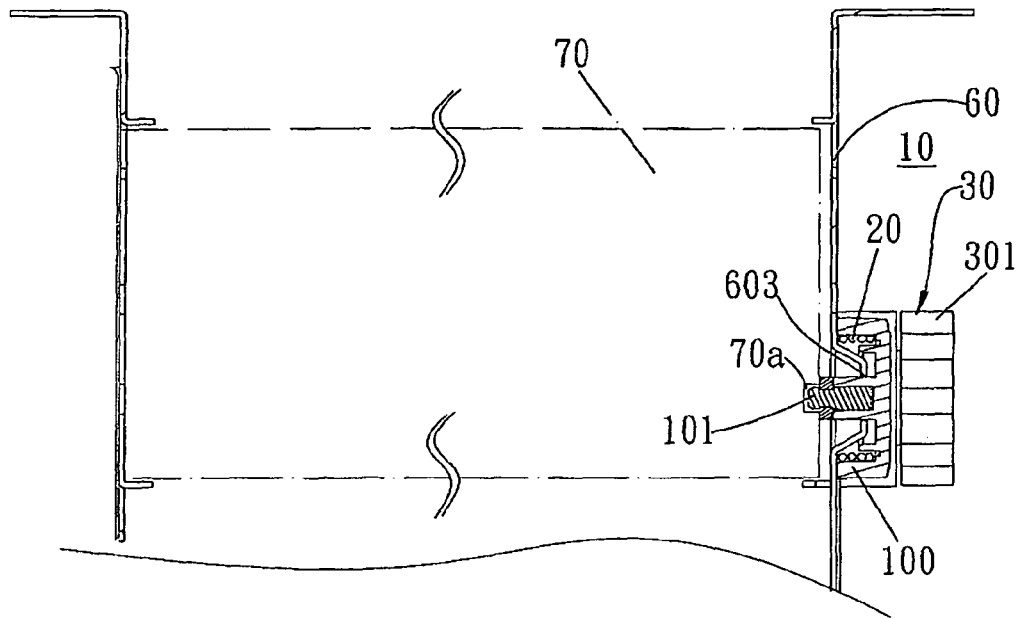
FIG. 9 is a sectional view of the fastening device according to the present invention in a position for securing a read/write or storage device.

FIG. 8 is a schematic perspective view of a plurality of the read/write or storage devices 70 fastened in place by the fastening devices 10 according to the present invention. As shown in the drawing, the read/write or storage devices 70 are first inserted into the read/write or storage device installation frame 60. Then, referring also to FIGS. 6 and 9, the knob portion 301 of the locking knob 30 of each said fastening device 10 is rotated so as to push the corresponding pressing plate 100 and its pins 101 to move forward. As a result, the pins 101 are inserted into threaded holes 70a of each said read/write or storage device 70 to secure each said read/write or storage device 70 in position.

Figure 10:
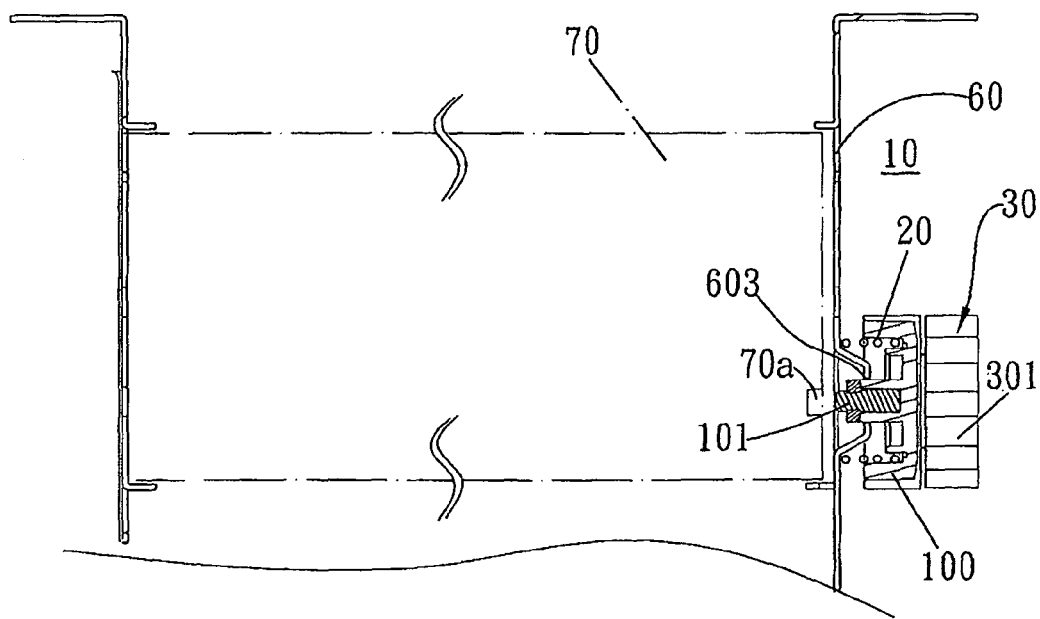
FIG. 10 is a sectional view of the fastening device according to the present invention in a position for releasing a read/write or storage device.

Further, as shown in FIGS. 7, 8, and 10, when it is desired to detach any of the read/write or storage devices 70, the knob portion 301 of a corresponding said locking knob 30 is rotated in an opposite direction so as to move the locking knob 30 backward. Thus, the corresponding pressing plate 100 along with its pins 101 are pushed backward by the restoring force of the springs 20, so that the pins 101 are disengaged from the threaded holes 70a of the read/write or storage device 70, allowing the read/write or storage device 70 to be removed successfully.

It can be known from the above description that the structure of the present invention is capable of achieving the intended effects. Besides, the disclosed fastening device has not been put to public use. Therefore, the present invention meets the requirements of utility and novelty for patent application, and an application for patent for the present invention is hereby lawfully filed for examination.

It should be noted that the present invention is herein described by reference to a preferred embodiment. Any changes which are based on the concepts of the present invention and whose functions and effects do not depart from the spirit of the present invention as disclosed in the specification and the accompanying drawings should be encompassed by the appended claims.

What is claimed is:

1. A fastening device for a computer read/write or storage device, essentially comprising:
   a pressing plate bilaterally provided with pins and centrally provided with an axial hole, wherein the axial hole has an upper rim extended with an inclined projection, and the pins bilaterally provided on the pressing plate are equipped with springs, respectively;
   a locking knob having a knob portion whose bottom surface is extended centrally with a nut, wherein a pushing block is protrudingly provided between the bottom surface of the knob portion and the nut;
   a threaded-post plug comprising a plug base centrally and protruding provided with a threaded post, wherein the plug base is provided with a pair of oppositely positioned resilient hooks and a pair of oppositely positioned projecting blocks; and
   a read/write or storage device installation frame having a side panel protruding provided with a fastening hole and two through holes formed by a stamping process, wherein the fastening hole is further formed with engaging recesses, and the threaded-post plug is pressed and inserted into the fastening hole so that the resilient hooks of the plug base are biased inward, and, when the threaded-post plug is in place, the two resilient hooks spring back and resume original positions thereof so as to engage with a rim of the fastening hole while the two projecting blocks are inserted into the engaging recesses, respectively, thereby securing the threaded-post plug in position to the fastening hole;
   wherein after the threaded-post plug is inserted into and secured in position to the fastening hole of the side panel of the read/write or storage device installation frame, the threaded post of the threaded-post plug is inserted into the axial hole centrally provided on the pressing plate so that the pins bilaterally provided on the pressing plate and equipped respectively with the springs are inserted into the through holes of the side panel, respectively, and the threaded post is further fastened with the nut of the locking knob.

2. The fastening device for a computer read/write or storage device of claim 1, wherein upon clockwise or counterclockwise rotation of the locking knob by the knob portion, the pushing block of the knob portion is pressed against by the inclined projection of the axial hole of the pressing plate so as to restrict an angular range of the clockwise or counterclockwise rotation of the locking knob, thereby preventing the locking knob from getting loose while allowing the locking knob to drive the pressing plate and the pins thereof to move forward or backward, so that the read/write or storage device is rapidly fastened in place or rapidly detached.

* * * * *